United States Patent

Palm

[11] Patent Number: 6,164,887
[45] Date of Patent: Dec. 26, 2000

[54] SCREW FOR JOINING THIN WORKPIECES

[75] Inventor: Erich Palm, Au, Switzerland

[73] Assignee: SFS Industrie Holding AG, Heerbrugg, Switzerland

[21] Appl. No.: 09/403,956

[22] PCT Filed: Apr. 25, 1998

[86] PCT No.: PCT/EP98/02475

§ 371 Date: Nov. 1, 1999

§ 102(e) Date: Nov. 1, 1999

[87] PCT Pub. No.: WO98/50706

PCT Pub. Date: Nov. 12, 1998

[30] Foreign Application Priority Data

May 2, 1997 [DE] Germany .......................... 197 18 712

[51] Int. Cl.[7] .............................. F16B 25/00; F16B 35/06
[52] U.S. Cl. ..................... 411/387.7; 411/399; 411/409; 411/919
[58] Field of Search ...................... 411/399, 402, 411/405, 407, 409, 387.1, 387.2, 387.3, 387.4, 387.5, 387.6, 387.7, 387.8, 919

[56] References Cited

U.S. PATENT DOCUMENTS

| | | | |
|---|---|---|---|
| 350,231 | 10/1886 | Brown ...................................... | 411/399 |
| 2,024,071 | 12/1935 | Taylor et al. ........................ | 411/399 X |
| 2,247,499 | 7/1941 | Hutchison, Jr. ...................... | 411/405 X |
| 2,321,379 | 6/1943 | Green . | |
| 2,383,670 | 8/1945 | Moss ....................................... | 411/409 |
| 3,859,888 | 1/1975 | Okada . | |
| 4,941,787 | 7/1990 | Shaffer . | |
| 5,378,101 | 1/1995 | Olson . | |
| 5,401,133 | 3/1995 | Kuchler ................................... | 411/402 |
| 5,487,633 | 1/1996 | Roberts ................................. | 411/399 X |
| 5,622,464 | 4/1997 | Bill et al. .................................. | 411/399 |

FOREIGN PATENT DOCUMENTS

| | | |
|---|---|---|
| 517671 | 6/1992 | European Pat. Off. . |
| 24 91 563 | 4/1982 | France . |
| 4036267 | 5/1992 | Germany . |
| 4126539 | 2/1993 | Germany . |
| 93 14 466 | 2/1994 | Germany . |
| 1 188 163 | 4/1970 | United Kingdom . |
| 1 446 437 | 8/1976 | United Kingdom . |

OTHER PUBLICATIONS

DIN 7976, Dec. 1972, pp. 371 & 372.
DIN 912, Dec. 1983, p. 1,2, pp. 156 & 157.
DIN 479,Jul. 1968, pp. 73.

Primary Examiner—Neill Wilson
Attorney, Agent, or Firm—Volpe and Koenig, P.C.

[57] ABSTRACT

A screw comprises a shank (2) and a head provided with a tool drive (6). The shank is provided with a thread (4), and at its free end has a boring part (5). The head (3), measured in axial direction of the screw (1), has a height (LK), which is smaller than the pitch (S) of the thread (4) formed on the shank (2). An external tool drive (6) is formed on the head (3).

7 Claims, 1 Drawing Sheet

SCREW FOR JOINING THIN WORKPIECES

BACKGROUND OF THE INVENTION

1. Field of the Invention

The invention relates to a screw for joining thin workpieces, with a shank and a washer-like head provided with a tool drive, wherein the shank is provided with a thread and at its free end remote from the head has a hole-forming or hole-boring point, and wherein the head, measured in the axial direction of the screw, has a height which is smaller than twice the pitch of the thread formed on the shank.

2. Description of the Related Art

Self-boring and self-tapping screws are usually used precisely for mutual fastening of relatively thin materials or for fastening of thin materials to a fixed substructure, while for technical reasons it is not possible to use countersunk head screws, because an appropriate recess cannot also be formed simultaneously in a workpiece in a single boring and driving process. If a lining element such as a plate is to be subsequently attached in this fastening region, either a corresponding countersunk opening must be made beforehand or screw heads with correspondingly large height must be tolerated, even though they do not allow subsequently mounted plates to rest almost flat on the substructure over a large area.

The object of the present invention is therefore to provide a screw of the type mentioned in the introduction, with which there can be achieved secure fastening in which the screw is not weakened by a socket drive and a sound joint is not prevented by stripping of the thread.

BRIEF SUMMARY OF THE INVENTION

According to the invention, it is proposed for this purpose that an external tool drive be formed on the head and that, between the head and the thread provided on the shank, there be formed an unthreaded shank portion, whose length is equal to or slightly smaller than the total thickness of the workpieces to be joined to one another.

Heretofore it has always been assumed among experts that, for self-boring and self-tapping screws, the screw head must have an appropriate height in order that the torque for the boring and thread-forming process can be transmitted. Even in the arrangement comprising a socket drive, the head must have an appropriate height, since the socket drive must not penetrate into the region of the shank of the screw in the very case in which no countersunk head structure is provided.

By means of the present invention it has been made possible to construct the head of a screw with extremely low height, so that this low head height does not pose a hindrance even during subsequent placement and assembly of lining plates or the like. It has also been shown that the torque for the boring and thread-forming process can be transmitted optimally with an external tool drive, especially when the head of the screw has such a low height.

In the case of fastenings which will subsequently be covered, for example by lining plates, it is usually unimportant if slight assembly traces are left behind under certain circumstances by the tool used. Even when the head has such a low height, it can be held properly until final setting is achieved.

The unthreaded shank portion raises the possibility that the screw can be stripped after it has been finally set. A permanent joint between the two workpieces is then ensured, and so the screw can no longer be loosened even by turning it in reverse direction. Precisely in the case of such fastenings, in fact, it is merely necessary that the two workpieces be pressed against each other in the fastened position. An additional advantage is that disconnection of the driving tool does not absolutely have to be torque-dependent manner or caused by a stop.

One advantageous embodiment of the invention provides that the head, measured in axial direction of the screw, has a height which is smaller than the pitch of the thread formed on the shank. In this way there is provided an extremely low height of the head of the screw, which on the one hand permits optimal seizing in a tool by means of the external tool drive, and on the other hand achieves the special advantages that a countersunk opening does not have to be present or to be formed and the projecting head does not cause a hindrance for the subsequent assembly of plates.

In the structural respect, it is advantageous when the head has a polygonal external tool drive. Such a construction can be qualified as particularly simple from the viewpoint both of manufacture and of handling in an appropriate tool.

It is also entirely possible, however, for the head to have a noncircular, curved external tool drive. The features according to the invention make it possible to design a particular external tool drive specific to the user in this case, since the main requirement is to have available a relatively shallow head and, in some form or another, an external tool drive.

In this connection it is also conceivable for the head to be provided on its outside periphery with raised structures and/or depressions for forming an external tool drive. In this way the joint between the head and the shank of the screw is always sufficiently good that the necessary torque can be transmitted. This is possible because—in contrast to a construction with a socket drive—no kind of additional material weak spots are present in the transition region between the head and the shank.

In order additionally to create the capability of holding the screw captively beforehand in a special tool, it is provided that the tool can engage with the head from behind, at least to a slight extent. This is achieved according to the invention by chamfering the head conically in the direction of the shank.

By further providing that an imaginary inscribed envelope circle on the head is at least approximately as large in diameter as the major diameter of the thread on the shank, it can be additionally brought about that the screw is already guided with its alignment in axial direction when initially started on the workpiece. For example, if the head is square, practically only the corner regions of this square head, which are seized by the appropriate tool, project beyond the major diameter of the thread. When the screw is inserted into this tool, the opening, which then has substantially square cross section, can also be used as a guide for the threaded region of the shank. As the driving-in process progresses, the head of the screw is drawn gradually out of the opening in the driving tool, but the shank itself no longer needs to be guided in this advanced driven-in stage.

Further features according to the invention and special advantages will be illustrated in more detail in the description hereinafter with reference to the drawing, wherein:

DETAILED DESCRIPTION OF THE PREFERRED EMBODIMENT(S)

Figure 1:
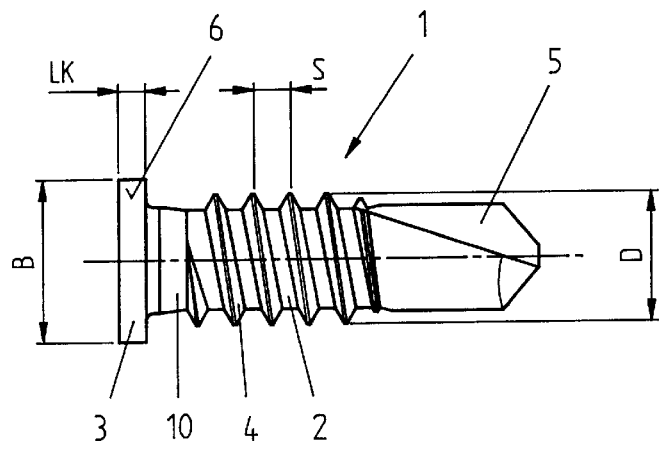
FIG. 1 shows a side view of a screw according to the invention.
Figure 2:
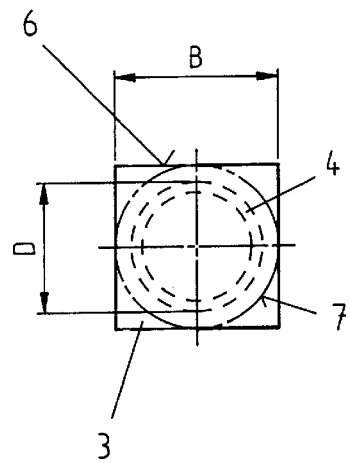
FIG. 2 shows a face view of this screw from the head end.
Figure 3:
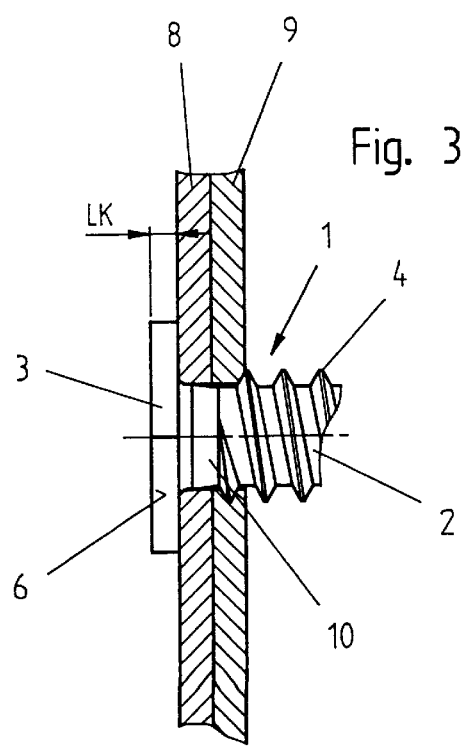
FIG. 3 shows, in finally set condition, a screw joining two workpieces to one another.

Screw 1 comprises a shank 2 and a head 3 provided with a tool drive. The shank is provided at least partly with a thread 4. In the embodiment shown here, a boring part 5 is formed at the free end of shank 2 remote from head 3. Measured in axial direction of screw 1, head 3 has a height LK which is smaller than twice pitch S of thread 4 formed on shank 2, and it has an external tool drive 6. From the illustrated practical example it is evident that height LK of head 3 is even smaller than pitch S of thread 4. In the alternative embodiments according to FIG. 1 to 3 there is therefore achieved a head 3 which is constructed substantially in the form of a washer and has a polygonal external tool drive 6, which in the very special case here is a four-sided polygon, meaning that in top view head 3 has square shape. If an inscribed envelope circle 7 (FIG. 2) is imagined in such an embodiment of head 3, then obviously it is at least approximately equal in size to major diameter D of thread 4 or, as in the illustrated example, somewhat larger than the said diameter. If an appropriately deep socket— which must have square cross section in order to be able to seize head 3—is then provided in a tool in order to allow insertion of a screw, additional guidance for starting the screw on workpieces 8 and 9 to be joined together is achieved in the front region of the tool by its ability to enclose thread 4, even though only a relatively short axial region of the tool is available for engaging appropriately with head 3. The guidance for the screw itself becomes better the smaller the difference between width B of screw head 3, which is square in this case, and major diameter D of thread 4. The best guidance of all is therefore achieved when width B practically corresponds to diameter D, or in other words when envelope circle 7 has the same diameter as major diameter D of thread 4.

Between head 3 and the thread provided on shank 2 there is expediently provided an unthreaded shank portion 10. In the case of correspondingly thin workpieces 8 and 9 to be joined together, this embodiment permits stripping of the screw without excessive increase in torque. Even if the screw is stripped, workpieces 8 and 9 will be held firmly together, and for practical purposes it is no longer possible for this screwed joint to be loosened by turning screw 1 in reverse direction.

If the special embodiment of a tool permits screw head 3 to be firmly held, then it can be additionally provided that head 3 is conically chamfered between tool drive 6 and unthreaded shank portion 10 in the direction of shank 2. In this case, an undercut as viewed from screw head 3 toward workpiece 8 would be formed in the finally set condition, thus permitting the head to be seized by, for example, radially opening or closing jaws.

Figure 4:
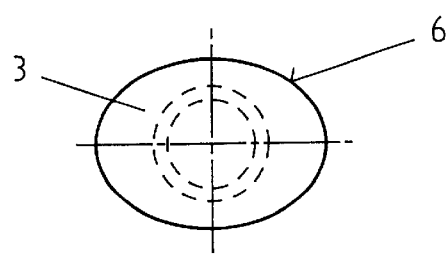
FIG. 4 and FIG. 5 show two special embodiments of the head of a screw.
Figure 5:
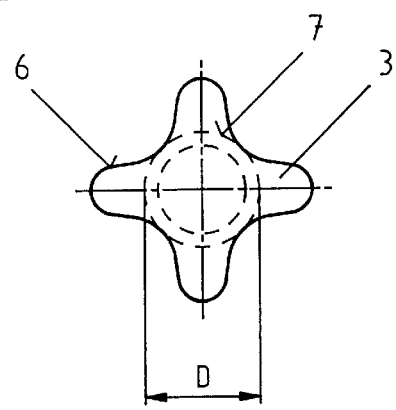

In the embodiments according to FIG. 4 and 5, head 3 of screw 1 is also constructed in the form of a washer, but has a noncircular, curved external tool drive 6. The most diverse geometric options for an external tool drive 6 are possible here and, under certain circumstances, it is also conceivable that such screws can be driven in and if necessary loosened again only by authorized persons. Precisely such forms require a special tool, in order to have any possibility whatsoever of seizing such an external tool drive 6 properly.

The embodiment according to FIG. 5 shows that, in this case, an imaginary envelope circle inscribed in tool drive 6 on head 3 of screw 1 has the same size as diameter D of thread 4. In such an embodiment, the opening in the corresponding tool is matched to the shape of external tool drive 6, while nevertheless aligned guidance is available for shank 2 in the region of thread 4.

Within the scope of the invention, various embodiments can be provided precisely in the region of head 3. Instead of a polygonal external tool drive or instead of noncircular, curved external tool drives, various raised structures and/or depressions are also possible for forming an appropriate external tool drive.

In the foregoing description it was assumed for screw 1 that a boring part 5 is formed at one end of shank 2. It is equally conceivable to use an appropriate boring tip here or else to provide a hole-forming point. The screw itself can be made in one piece, and of the same material throughout. It is also conceivable, however, to make boring part 5 or an appropriate boring tip or a hole-forming point from another material and to weld it to the remaining shank portion.

The extremely low head height provided according to the invention proves advantageous in particular if lining plates or the like must be mounted subsequently on workpieces 8 and 9 joined to one another. In the case of elements flush with the wall, for example, no problems of any kind are then encountered with the screw heads, which protrude to only a small extent. The features according to the invention are naturally also usable in screws which are used in any form as fastening elements. Even if the low head height is chosen not because other plates will also be mounted subsequently, such a shallow head proves to be esthetic even for other types of fastening and, in particular, appropriate security is achieved, since tools suitable for loosening such a screw are hardly available.

What is claimed is:

1. A screw for joining thin workpieces, (8,9) with a shank and a washer-like head provided with a tool drive, wherein the shank is provided with a thread and at its free end remote from the head has a hole-forming or hole-boring point, and wherein the head, measured in the axial direction of the screw, has a height which is smaller than twice the pitch of the thread formed on the shank, characterized in that an external tool drive (6) is formed on the head (3) and that, between the head (3) and the thread (4) provided on the shank (2), there is formed an unthreaded shank portion (10), whose length is equal to or slightly smaller than the total thickness of the workpieces (8, 9) to be joined to one another.

2. A screw according to claim 1, characterized in that the head (3), measured in axial direction of the screw (1), has a height (LK) which is smaller than the pitch (S) of the thread (4) formed on the shank.

3. A screw according to claim 1, characterized in that the head (3) has a polygonal external tool drive (6).

4. A screw according to claim 1, characterized in that the head (3) has a noncircular, curved external tool drive (6).

5. A screw according to claim 1, characterized in that the head (3) is provided on its outside periphery with raised structures and/or depressions for forming an external tool drive (6).

6. A screw according to claim 1 characterized in that the head (3) is chamfered between the tool drive (6) and the unthreaded shank portion (10) in the direction of the shank (2).

7. A screw according to claim 1, characterized in that an imaginary inscribed envelope circle (7) on the head (3) is at least approximately as large in diameter as the major diameter (D) of the thread (4) on the shank (2).

* * * * *